United States Patent [19]

Arth

[11] 4,244,526
[45] Jan. 13, 1981

[54] FLOW CONTROLLED SHOWER HEAD

[76] Inventor: Michael J. Arth, 21040 Detroit Rd., Rocky River, Ohio 41116

[21] Appl. No.: 934,321

[22] Filed: Aug. 16, 1978

[51] Int. Cl.³ .......................... B05B 1/18; E03C 1/08
[52] U.S. Cl. ............................... 239/533.1; 137/517; 138/44; 138/46; 239/553; 239/562; 239/570
[58] Field of Search .............. 239/452, 456, 457, 459, 239/460, 533.1, 552–553.5, 562, 570, 587, 590, 590.3, 590.5; 138/41, 43–46; 285/8; 137/517

[56] References Cited

U.S. PATENT DOCUMENTS

| 780,986 | 1/1905 | Francis | 138/46 X |
|---|---|---|---|
| 2,589,888 | 3/1952 | Stampfl | 138/45 |
| 2,658,799 | 11/1953 | Fraser | 239/460 |
| 2,680,043 | 6/1954 | Campbell | 239/452 X |
| 2,688,515 | 9/1954 | Filliung | 239/452 X |
| 2,727,784 | 12/1955 | Hansen | 239/570 X |
| 2,789,013 | 4/1957 | Bletcher et al. | 239/570 X |
| 3,007,648 | 11/1961 | Fraser | 239/460 |
| 3,887,136 | 6/1975 | Anderson | 239/460 |
| 3,999,714 | 12/1976 | Lang | 239/570 |
| 4,075,294 | 2/1978 | Saito et al. | 138/46 X |
| 4,082,225 | 4/1978 | Haynes | 239/533.1 X |

*Primary Examiner*—Andres Kashnikow
*Attorney, Agent, or Firm*—Watts, Hoffman, Fisher & Heinke Co.

[57] ABSTRACT

A shower head assembly having a flow regulator for maintaining a flow rate through the shower head within preset limits, substantially independent of variations in supply pressure and operating temperature. The flow regulator includes a flow controller element disposed in a regulating chamber, biased in one direction by a metallic spring and urged in the opposite direction by supply pressure. The controller element cooperates with an outlet passage in the regulating chamber to form a variable orifice, reducing the effective area of the outlet in response to increased supply pressure. A retainer screen keeps the flow controller and biasing spring in place while serving as a protective filter.

10 Claims, 4 Drawing Figures

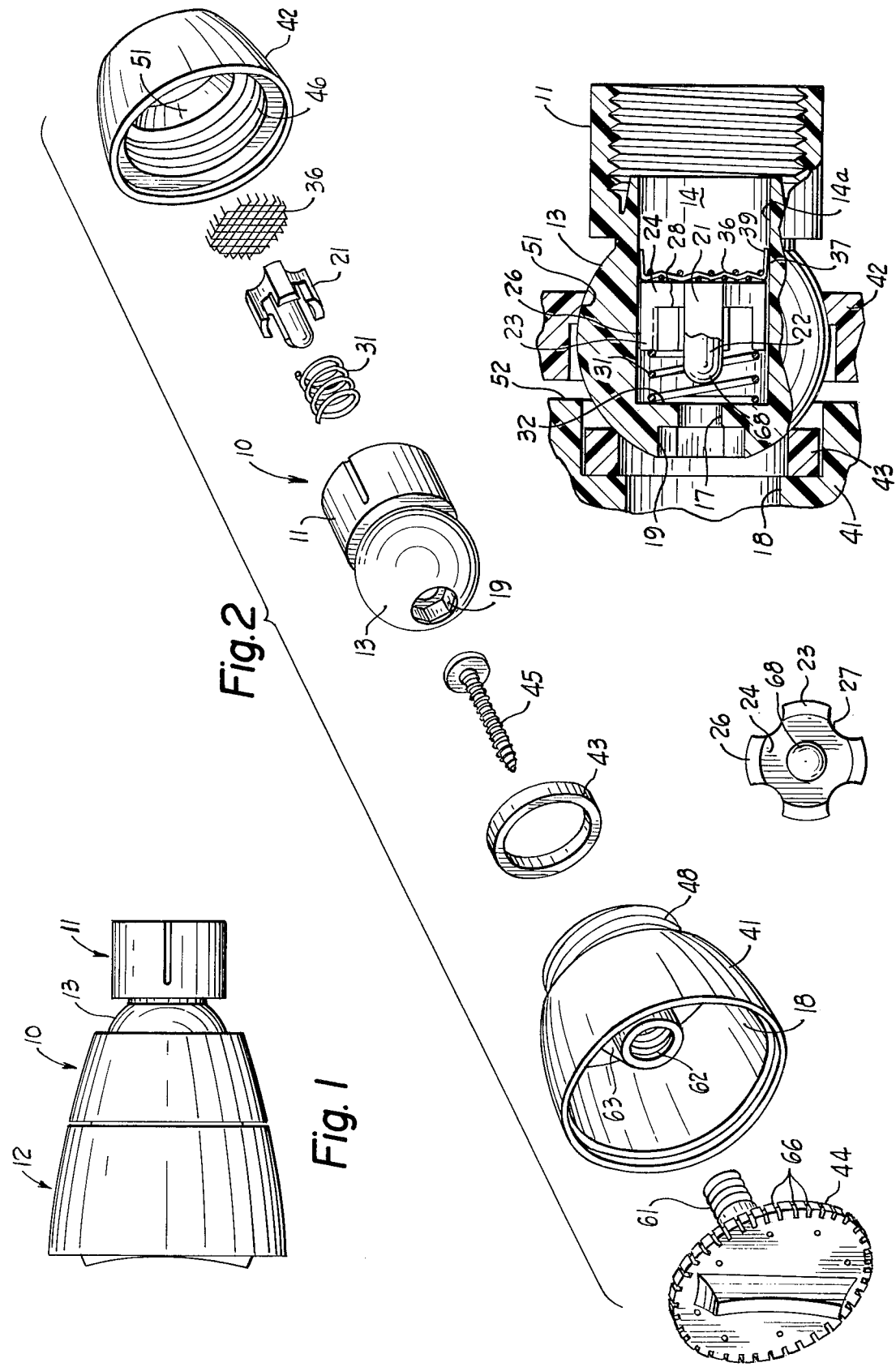

FLOW CONTROLLED SHOWER HEAD

BACKGROUND OF INVENTION

The invention relates to shower heads and, in particular, to a type of spray head in which a flow regulator is provided to maintain a fluid flow rate within preset limits regardless of variations in supply pressure and operating temperatures.

A typical shower head produces a conical spray pattern of water. It produces this effect by causing water from the supply line to be directed through a plurality of orifices, each substantially smaller than the size of the supply line. These orifices subdivide the flow into fine streams of water and further serve to spread the flow of water over a larger area.

The rate of flow through a typical shower head is dependent upon numerous factors, including the supply line pressure. Generally, the supply line pressure will vary among installation sights and also will vary during the course of a day at a given installation site. The effectiveness of the spray pattern as well as the water flow rate will vary with the supply line pressure. Common shower heads have a fixed outlet size and are designed to provide adequate shower operation at average pressures and at average water flow rates. Such shower heads are not suitable for installation in applications where extreme pressure variation occurs.

In installations where water conservation is of concern, a shower head capable of maintaining a water flow rate within certain limits regardless of supply line pressure is necessary. A military ship is an example of such an installation because it has a limited supply of water which makes water conservation an absolute necessity. For this reason, shower heads for use on military ships must meet certain military specifications, specifically MIL-S-955C. This specification requires that a shower head provide a constant flow rate within specified limits and over a range of operating temperatures and a range of supply pressures.

Shower heads have been proposed in the past which were intended to meet this specification but none has proved consistantly successful. These proposals would employ devices intended to regulate and maintain a constant flow rate under varying pressure conditions. One proposed system would employ an elastomeric flow control element which included an aperture, the size of which was intended to vary depending on the supply line pressure. This element was proposed to be interposed in the flow control path to act as a variable restriction. One problem encountered with this type of device, is that the properties of elastomeric materials vary with operating temperature and with age. Additionally, they can be quite difficult to manufacture consistently. Thus, although these elements theoretically should maintain a constant flow rate in a shower head, in operation they fail to do so because the physical properties of the material vary due to the operating environment and the manufacturing process itself.

A second problem associated with prior shower heads is cost. In many of these suggested shower heads, the flow regulating devices added significantly to the overall manufacturing cost. This coupled with marginal performance rendered these shower heads unsuitable for many applications.

SUMMARY OF THE INVENTION

The present invention overcomes the foregoing limitations and problems and does so without adding excessive manufacturing cost. The invention presents a shower head which automatically compensates for variations in supplied line pressure and maintains a rate of flow within specified limits. It is relatively unaffected by operating temperature and by operating fatigue. Further, the flow regulator components provided by the invention have a configuration and function which are readily incorporated into existing convential shower head designs with minimal changes or tooling.

In its preferred embodiment, the shower head includes: an orifice housing for sub-dividing the coherent supply flow into a plurality of individual streams of water, a spherical segment to which the orifice housing is swivelly connected, and a coupling for connecting the shower head to a supply line. The spherical segment contains within it the flow regulator components and structure. This configuration does not add to the bulk or length of the shower head and furthermore, a seal on the spherical segment is exposed to a reduced pressure developed by the flow regulator thereby minimizing fluid leakage between the spherical segment and the spray nozzle swivelly mounted to the segment.

The flow regulator includes a spider-like controller element which slides axially in a bore located in the spherical segment in response to supply line pressure. This element is spring biased in a direction allowing maximum flow through the shower head. Supply line pressure acting on the face of the control element urges it in a direction tending to close-off or throttle the flow through the shower head by obstructing the flow path to the nozzle or orifice housing. The higher the supply line pressure, the further the controller element will be urged thereby decreasing the size of the opening through which the water can flow through to the orifice housing. The flow rate through the shower head is self-regulated by the interaction of the spring bias and the supply line pressure on this controller element.

In the preferred embodiment the control element is constructed of a material such as an acetal resin having very stable physical properties in the normal operating temperature range of the shower head. Because the shower head relies on the axial movement of the control element and not the elastomeric deformation of this element, the flow rate through the shower head will not vary with variations in physical properties of the control element. The shower head is inherently self-cleaning and non-clogging. A retainer screen serves to maintain the flow control elements in assembled relation and at the same time serves to filter fluid flowing through the shower head.

In addition to the above-mentioned features and advantages, the disclosed shower head is economical to manufacture and simple to both assemble and repair. Various additional features and advantages of the invention will become apparent from an understanding of the following discussion of one specific embodiment of the invention.

BRIEF DESCRIPTION OF THE DRAWING

FIG. 1 is a side view of a shower head assembly constructed in accordance with the principles of the invention;

FIG. 2 is an exploded, perspective view of the assembly of FIG. 1, showing its internal parts;

FIG. 3 is a fragmentary, cross sectional view of the assembly taken along its axis at a coupling end; and FIG. 4 is an end view looking in an upstream axial direction of a flow regulator element of the head assembly.

DESCRIPTION OF THE PREFERRED EMBODIMENT

A shower head assembly 10 having at one end a coupling 11 and at an opposite end a spray nozzle 12 is illustrated in FIG. 1. The spray nozzle is connected to the coupling 11 in a manner permitting universal orientation or angular adjustment. The coupling 11 is preferably molded of thermoplastic material, such as acrylonitrile-butadiene-styrene resin commonly known as ABS, and has an internal pipe thread, typically ½" NPS, at an inlet end adapted to be connected to a pipe nipple of a supply line.

Integrally formed with the coupling 11 is a spherical segment 13. A hexagonal hole 19 in the outer face of the spherical segment forms an output end which communicates an outlet passage 17 in the segment 13 to an interior 18 of the nozzle 12. This hexagonal hole 19 is adapted to receive a tool of complimentary shape for installation and removal of the coupling 11 on a supply pipe.

Included within the spherical segment are the structure and components of a flow regulator. An internal, cylindrical bore 14a within the segment 13 defines a chamber 14 in direct communication with and extending axially from the interior of the coupling 11. The outlet passage 17 is in the form of a cylindrical counterbore in the body of the spherical segment 13, located in axial alignment with and intermediate the chamber bore 14a and the hexagonal hole 19. This outlet passage 17 forms a regulated flow outlet.

Disposed within the chamber 14 is a flow controller element 21, ideally formed of a suitably molded relatively rigid plastic material such as an acetal resin, available as CELCON, a trademark of Celanese Corporation of America. The controller element 21 is an integral unit having a central, axially extending pin 22 concentrically surrounded by a set of four axially extending fingers 23, the pin 22 and the fingers 23 being supported by a radially extending web 24. Outer surfaces 26 of the fingers 23, as indicated in FIG. 4, lie on a common imaginary cylinder and define points, preferably lines of contact with the bore 14a. The fingers 23 are disposed relative to one another to support and guide the controller element 21 for sliding movement in the chamber 14 with the pin 22 in axial alignment or coaxial with the counterbore or outlet 17. The web 24 is generally circular in end view, but is interrupted with four peripheral notches 27 intervening the fingers 23. A face 28 of the web is exposed to the pressure of fluid supplied to the interior of the coupling 11 and the notches 27 allow passage of such fluid around the element 21.

A compression spring 31 is interposed between a radial end wall 32, extending between the outlet 17 in the chamber 14, and the flow controller element 21 to resiliently bias the element towards the coupling 11 and away from the regulated flow outlet 17. The spring 31 is preferably formed of stainless steel wire for corrosion resistance and to avoid significant changes in its spring rate with expected temperature variations of, for example, from 60 degrees F. to 140 degrees F. in fluid flowing through the head assembly.

A cup-shaped screen 36 serves to both retain the spring 31 and the element 21 in the chamber 14 and to filter all of the fluid passing through the head 10. The screen 36, ideally, is stamped from flat brass screen stock to form a peripheral rim 37. A suitable screen material for the retainer screen 36 is No. 16 mesh brass screen of 0.018 inch wire. The retainer rim 37, in a free state, is frustum-shaped with its peripheral or free edge 39 forming a diameter somewhat greater than the diameter of the chamber 14. As indicated in FIG. 3, the retainer screen 36 is inserted into the area of the chamber 14 enveloped by the spherical segment 13, with its concave face directed upstream or towards the coupling 11.

When the retainer screen 36 is disposed in the chamber 14, the rim 37 is radially compressed so that at least its peripheral or free edge 39 is in tight frictional engagement with the wall of the chamber 14. Depending on the desired permanency of the placement of the retainer screen 36, the screen can be dimensioned to cause individual wire ends of the peripheral edge 39 to bite into the relatively softer plastic body of the coupling 11.

The nozzle 12 is an assembly of several circular elements comprising a main shell 41, a threaded collar 42, a gasket 43, and an orifice disc 44. The shell 41, collar 42, and disc 44 are preferably formed of a relatively rigid plastic, such as Acrylonitrile-butadiene-styrene resin (ABS). The gasket 43 is a relatively softer elastomeric material. In assembly, internal threads 46 in the collar 42 mate with external threads 48 on the shell 41 to draw a socket 51 of the collar and a rearward grooved face 52 of the shell towards one another from opposite sides of an imaginary, equatorial plane of the spherical segment 13.

During tightening of the collar 42 on the shell 41, these members may be oriented in any desired direction relative to the spherical segment 13 by universal movement through a relatively large range. An axial stem 61 of the orifice disc 44 is threaded into a hub 62 centrally supported in the shell 41 by angularly spaced, integral spokes 63. A plurality of short radial notches or orifices 66 in the periphery of the disc 44, when in or immediately adjacent the shell 41, convert a consolidated flow from a supply pipe line received at the coupling 11 to a spray pattern. The characteristics of the spray pattern are functions of the axial position of the disc 44 and may be varied by turning the threaded axial stem 61 in the hub 62. The disc 44 is retained to the shell 41 by a screw 45 threaded into the stem 61 from the backside of the hub 62, i.e., from the side adjacent the grooved face 52, with the head of the screw being too large to pass through the hub. This configuration allows the orifice plate to be unscrewed a limited amount to provide limited access to the interior of the nozzle head 12 for cleaning, etc., while maintaining shower assembly integrity by preventing its complete removal.

In operation, referring to FIG. 3, water entering the coupling 11 and chamber 14 from the right passes through the retainer screen 36, notches 27, and the outlet 17. From the outlet 17, the water enters the interior 18 of the shell 41 and is then discharged through the orifices 66.

The flow controller element 21 maintains a flow rate through the head 10 within certain predetermined limits by varying the effective size of the central outlet or counterbore 17 in response to the supply pressure in the coupling 11. When supply pressure is relatively high, the fluid pressure develops a force on the web face 28 which is sufficient to overcome the resistance of the spring 31 and thereby move the spherical end, designated 68, of the controller pin 22 towards or into the outlet 17, thereby reducing the effective area of this outlet available for discharge of fluid. In situations where the supply pressure is relatively low, the spring 31 biases the element 21 towards the position illustrated in FIG. 1, wherein the upstream face of the controller web is adjacent or abutting the retainer screen 36 and the pin end 68 if sufficiently retracted from the outlet to avoid any substantial restriction of its effective size. The interaction between the controller element 21 and the outlet 17 establishes a variable orifice, responsive to supply pressure and adapted to maintain a flow rate through the outlet 17 within predetermined limits.

By way of example, a shower head assembly having the following characteristics and dimensions has been found to meet Mil Spec Mil-S-955C which requires that a shower head maintain a flow rate of 1.7 gallons per minute plus or minus 0.6 gallons per minute with supply pressures varying between 15 psi and 100 psi, and at temperatures between 80° F. and 120° F.

| | |
|---|---|
| Diameter of counterbore aperture 17: | .187" |
| Spring construction: | |
| material | stainless steel type 302 |
| wire size | .020" |
| outside diameter | .355" |
| free length | .530" |
| diameter of regulator pin 22 | .165" |
| diameter over regulator fingers 23 | .505" |
| radius of notches 27 | .203" located from points on an imaginary circle of .525" |

Although a preferred embodiment of this invention is illustrated, it is to be understood that various modifications and rearrangements of parts may be resorted to without departing from the scope or scope of the invention as described and hereinafter claimed.

What is claimed is:

1. A shower head assembly comprising a coupling adapted to be connected to a supply line,
   a spray head having an orifice means for producing a spray pattern,
   the head assembly defining an internal flow path for conducting fluid received in said coupling to said orifice means,
   a flow regulating means including a chamber in said flow path, defined by an internal surface, and having an inlet and an outlet,
   a flow controller element disposed within said chamber, said flow controller element including a radial extending web having an effective pressure area exposed to fluid pressure in said supply line,
   a plurality of support fingers extending axially from peripherial portions of said radial extending web,
   a restriction member extending axially from a central portion of said radial web,
   said fingers defining surfaces for coacting with said internal surface of said chamber to support and guide said flow controller element within said chamber for movement towards and away from said outlet of said chamber in response to changes in fluid pressure of said supply line acting on said effective pressure area and,
   spring means biasing said element away from said outlet.

2. A shower head as set forth in claim 1 further including a retainer element disposed in said chamber upstream of said flow controller element, said retainer being a perforate body forming a filter for fluid passing into said chamber, and said retainer element being secured against said internal surface of said chamber by a friction fit.

3. A shower head assembly, having coupling means for connection with a supply line and orifice means for producing a spray pattern, a body including an internal, generally cylindrical chamber bore in fluid communication with the coupling means and a counterbore communicating and coaxial with said cylindrical chamber bore, a radial end wall extending generally radially between said counterbore and said cylindrical bore, a flow controller element having a central zone supporting an axially extending pin adapted to restrict said counterbore and a peripheral zone supporting a plurality of axially extending fingers including surfaces for coacting with said cylindrical chamberbore to support and guide said flow controller element within the cylindrical chamber bore so that said pin is maintained in confronting radial alignment with said counterbore, a face of said controller element defining an effective pressure area exposed to pressure of fluid entering said coupling means, and a metallic compression spring disposed between said element and said radial end wall and biasing said element in an axial direction opposite the force developed on said element by pressure of fluid at said coupling means, said radial end wall further providing an abutment means for said extending fingers to limit movement of said controller element towards said counterbore.

4. The shower head assembly of claim 3 wherein said flow controller element includes at least two fingers and said pin is of substantially uniform diameter.

5. The shower head assembly of claim 3 wherein said flow controller element includes four fingers and said surfaces on said fingers define partial cylinders.

6. A flow regulator for maintaining a flow rate through a shower head within predetermined limits, comprising:
   (a) structure defining a regulating chamber having an inlet and an outlet and an internal cylindrical surface;
   (b) a flow controller element disposed within said regulating chamber, the element including a radial extending web having a surface exposed to fluid pressure entering said inlet;
   (c) a restriction member extending axially from a central portion of said radial web and adapted to enter said outlet upon predetermined movement in said controller element, to restrict the flow of fluid therethrough;
   (d) a plurality of support fingers extending axially from peripherial portions of said radial web, said fingers including surfaces for coacting with said internal surface of said chamber to guide and support said flow controller element along a path towards and away from said outlet and for maintaining radial alignment of said restriction member with said outlet;
   (e) spring means applying axially directed forces on said flow controller element in opposition to fluid forces developed on said surface of said radial extending web by fluid entering said inlet.

7. A shower head assembly having means for maintaining a flow rate through the shower head within predetermined limits, comprising:
   (a) a head assembly including a coupling for connecting the shower head to a supply line and a spray head including an orifice means for dividing the fluid flow to produce a spray pattern;
   (b) structure defining a regulating chamber having an internal cylindrical surface, an inlet at one end of said chamber for receiving fluid pressure from said supply line, an end wall at the other end of said chamber and a counterbore in said end wall defining an outlet of said chamber;
   (c) a flow controller element disposed within said regulating chamber, moveable towards and away from said outlet, said element comprising:
      (i) a radial web having a surface exposed to fluid pressure entering said inlet;
      (ii) a plurality of fingers extending axially from peripheral portions of said radial web, said fingers including partial cylindrical surfaces for coacting with said internal surface of said chamber to support and guide said flow controller element along a path towards and away from said outlet and further including end surfaces for coacting with the end wall of said chamber to establish the maximum restriction position of said flow controller element;
      (iii) a pin member extending axially from a central portion of said radial web and in concentric alignment with said fingers, said pin member extending beyond said end surfaces of said fingers;
   (d) means biasing said controller element towards a position of least restriction of said outlet in opposition to fluid pressure forces exerted on said radial web surface, such that said pin member is spaced from said outlet when said fluid pressure entering said inlet is below a predetermined pressure.

8. The apparatus of claim 7 wherein said flow controller element includes peripheral notches intermediate said fingers, said notches providing a path of flow around said flow controller element.

9. The apparatus of claim 7 wherein said pin member is of substantially uniform diameter.

10. The apparatus of claim 7 wherein said flow controller element includes at least three fingers.

* * * * *